United States Patent [19]
Quinn et al.

[11] Patent Number: 5,785,498
[45] Date of Patent: Jul. 28, 1998

[54] COMPOSITE FAN BLADE TRAILING EDGE REINFORCEMENT

[75] Inventors: Kerry W. Quinn, Cincinnati; Bruce C. Busbey, Loveland; Stephen J. Szpunar, West Chester; Sidney B. Elston, III; James W. Tucker, both of Cincinnati, all of Ohio

[73] Assignee: General Electric Company, Cincinnati, Ohio

[21] Appl. No.: 593,186

[22] Filed: Jan. 29, 1996

Related U.S. Application Data

[63] Continuation of Ser. No. 316,196, Sep. 30, 1994, abandoned.

[51] Int. Cl.⁶ .................................................. F04D 29/18
[52] U.S. Cl. ............................................................. 416/224
[58] Field of Search ................................ 416/224, 229 A, 416/230

[56] References Cited

U.S. PATENT DOCUMENTS

| | | | |
|---|---|---|---|
| 1,545,560 | 7/1925 | Heath | 416/224 X |
| 1,939,357 | 12/1933 | Lorenzen | 416/224 |
| 3,148,954 | 9/1964 | Haas | 416/224 |
| 4,712,980 | 12/1987 | Gely et al. | 416/224 |
| 4,795,313 | 1/1989 | Coulon | 416/224 |
| 5,210,946 | 5/1993 | Monroe | 416/224 |
| 5,306,120 | 4/1994 | Hammer et al. | 416/224 |

FOREIGN PATENT DOCUMENTS

| | | | |
|---|---|---|---|
| 178599 | 8/1986 | Japan | 416/224 |
| 160226 | 2/1933 | U.S.S.R. | 416/224 |
| 284623 | 7/1968 | U.S.S.R. | 416/224 |
| 678193 | 8/1979 | U.S.S.R. | 616/224 |
| 823604 | 4/1981 | U.S.S.R. | |
| 195050 | 7/1923 | United Kingdom | 416/224 |
| 1231077 | 5/1971 | United Kingdom | |
| 1270348 | 4/1972 | United Kingdom | |
| 1284538 | 8/1972 | United Kingdom | |
| 1414146 | 11/1975 | United Kingdom | |
| 2194553 | 3/1988 | United Kingdom | |
| 2224784 | 5/1990 | United Kingdom | |
| 538385 | 7/1994 | United Kingdom | 416/224 |
| 2288441 | 10/1995 | United Kingdom | |

*Primary Examiner*—John T. Kwon
*Attorney, Agent, or Firm*—Andrew C. Hess; Patrick R. Scanlon

[57] ABSTRACT

The present invention provides a composite airfoil, particularly useful as a wide chord fan blade having a high degree of twist in a large high bypass ratio turbofan engine. The composite airfoil of the present invention has a reinforced region of its airfoil that extends a portion of its span from its tip and a portion of its chord from its trailing edge. The region is covered by thin metallic sheathing bonded to trailing edge surfaces of the blade in a manner to reinforce that portion of the composite blade.

4 Claims, 1 Drawing Sheet

COMPOSITE FAN BLADE TRAILING EDGE REINFORCEMENT

This application is a Continuation of application Ser. No. 08/316,196 filed Sep. 30, 1994, now abandoned.

BACKGROUND OF THE INVENTION

1. Field of the Invention

This invention relates to composite blades used in gas turbine engines and more particularly to trailing edge reinforcement of wide chord composite fan blades.

2. Description of Related Art

A great effort is underway to replace the relatively heavy metal blades and vanes of fluid flow machines such as gas turbine engine fans and compressors with lighter composite materials. This has led to the development of composite blades and vanes having high strength elongated filaments composited in a light weight matrix. Aircraft and aircraft engine designs continuously strive for reduced weight and greater efficiency. Other factors affecting aircraft and engine design involve cost and size, including the maintenance of the aircraft and the engines. Increased emphasis in these areas have led to aircraft that are growing in size thereby requiring either more thrust from the engines or additional engines. Reduced ownership and initial costs can be achieved by enlarging the engines and increasing their thrust capability and fuel efficiency rather than by increasing the number of engines on a particular aircraft. Todays larger aircraft are designed to use fewer engines than before, for example an aircraft designed to use 2 engines that each have a thrust capability of about 100,000 pounds. However, as the engines grow larger, weight reduction becomes paramount as all the engine components are required to grow.

The new generation of commercial high thrust engines are being designed and built with fan diameters ranging in size from about 100 inches to 124 inches. The increased fan diameters use longer fan blades with wider chords for increased efficiency. Conventional titanium narrow chord blades have a chord which is the axial straight line dimension between the trailing edge and the leading edge of the airfoil of about 8 to 12 inches. Wide chord fan blades for the larger engines will have tip chords in the range of about 20 to 28 inches. The wider chord blades offer the increased efficiency because they have greater stability margins and move the air more efficiently across the blade face due to their longer chords. The increased stability allows the blade to be manufactured without a mid-span shroud which on current titanium blades causes a decrease in blade efficiency. Increased blade efficiency is important in high bypass turbine engines because about 75% to 80% of the air bypasses the core engine combustor and is used to provide direct thrust produced by the fan.

A proposed solution to the problem of weight and cost for blades in larger engines is an all-composite wide chord fan blade. A large engine having all-composite wide chord fan blades offers a significant weight savings over a large engine having standard chorded fan blades. Composite wide chord fan blades also offer a somewhat smaller, but nevertheless substantial, weight savings over hollow titanium blades. Composite propeller and rotorcraft blade designs are well known in the industry; however, turbofan composite blades have never been used in the past for several reasons.

Over the years the term composite has had several meanings regarding the use of two or more materials having different properties. More recently, in the aerospace industry, the term composite has come to be defined as a material containing a reinforcement such as fibers or particles supported in a binder or matrix material. Many composites are adequate for the present invention including both metallic and non-metallic composites; however, the preferred embodiment is made of a unidirectional tape material and an epoxy resin matrix. A discussion of this and other suitable materials may be found in the "Engineering Materials Handbook" by ASM INTERNATIONAL, 198-71989 or later editions, which are incorporated herein by reference. The composite blades and airfoils of the present invention are preferably of the non-metallic type made of a material containing a fiber such as a carbonaceous, silica, metal, metal oxide, or ceramic fiber embedded in a resin material such as Epoxy, PMR15, BMI, PEEU, etc. Of particular use are fibers unidirectionally aligned into a tape that is impregnated with a resin, formed into a part shape, and cured via an autoclaving process or press molding to form a light weight, stiff, relatively homogeneous article having laminates within.

One particular problem which has discouraged the introduction of these light weight composite gas turbine engine fan blades is their particular vulnerability to what is referred to as foreign object damage (FOD). Many types of foreign objects may be entrained in the inlet of a gas turbine engine, ranging from large birds such as sea gulls to hailstones, sand, and rain. Damage from foreign objects takes two forms. Smaller objects can erode the blade material and degrade the performance of the fan and engine. Impact by larger objects may rupture or pierce the blades. Portions of an impacted blade can be torn loose and cause extensive secondary damage to adjacent and downstream blades and other engine components. In this regard, the consequences of foreign object damage are greatest in the low pressure compressors or fans of high bypass gas turbine engines. Many developments have been made to prevent composite fan blade failures, such as a leading edge strip, which also helps provide erosion protection for the fan blade and particularly for its leading edge. These leading edge protection strips allow the energy of the impact, such as during a bird strike, to be transmitted to the trailing edge of the fan blade causing it to locally oscillate and/or be rapidly displaced to a significant amplitude and fail. These oscillations or large rapid displacements of the trailing edge induces strains, which exceed the current material system limits, creating extensive internal delamination and surface fracture which leads to trail edge tip material loss and rotor imbalance. Excessive rotor imbalance can ultimately limit the speed and thrust takeoff power during episodes of bird ingestion. Engine thrust and operability must be maintained within certain levels after such an event. This type of failure mechanism is further exasperated by the high degree of twist used by airfoils of fan and other blades.

Thus, it has become highly desirable to develop light weight composite blades, particularly, large fan diameter wide chord fan blades which resist delamination due to trailing edge material loss mechanisms induced by foreign object impact into the blade.

SUMMARY OF THE INVENTION

The present invention provides a composite blade particularly useful as a wide chord fan blade in a large high bypass ratio turbofan engine wherein the blade is generally regarded as large and having a high degree of twist. The composite blade of the present invention has an airfoil made from a composite material and extending chordwise from a leading edge to a trailing edge and spanwise from a root to a tip. A reinforced surface region is covered with a metallic sheathing that extends over a portion of the airfoil, extending chordwise from the trailing edge towards the leading edge and, spanwise from the tip of the airfoil towards the root. The preferred embodiment of the invention provides the metallic sheathing over a region having a spanwise height and chordwise width which fully covers a trailing edge area of the blade that is susceptible to damage during large trailing edge oscillations which result from impacts along the leading edge.

One embodiment of the present invention provides metallic sheathing in the form of two thin metallic sheets, wherein a first sheet is bonded to a pressure side of the airfoil and a second sheet is bonded to a suction side of the airfoil. Another embodiment of the present invention provides metallic sheathing in the form of a single thin metallic sheet wrapped around the trailing edge and bonded to a pressure side and a suction side of the airfoil. Yet another embodiment of the present invention provides metallic sheathing in the form of a single thin metallic sheet bonded to only one of the sides.

A more specific embodiment of the present invention provides a mechanical fastener disposed through the sheathing and the pressure and suction sides of the airfoil to further secure the sheathing to the airfoil. Another more specific embodiment of the present invention provides the metallic sheathing in the form of a one-piece thin metallic sheet having two sections connected by a bridge. The bridge has a bridge height and the sections have a section height in the spanwise direction such that the bridge height is substantially shorter than the section height. The bridge is wrapped around the trailing edge and each one of the sections is bonded to a corresponding one of the sides. Another more particular embodiment of the present invention provides the airfoil with a leading edge metallic shield.

ADVANTAGES

Among the advantages provided by the present invention is a light weight composite blade that is highly resistant to delamination and failure caused by bending and impact from ingestion of things such as debris and particularly birds strikes. The trailing edge reinforced composite blade of the present invention enhances the design and FOD resistances of light weight composite blades, particularly, for such blades having wide chords and/or with a high degree of twist as are found in large diameter fans on modern high bypass ratio turbofan gas turbine engines. The invention inhibits trailing edge incipient delamination of composite blades and thereby improves both the strength of and lowers the weight of fan blades. This in turn improves fuel efficiency, lowering SFC (Specific Fuel Consumption).

Another advantage of the present invention is that it provides for the construction of a light weight composite blade design that allows for some energy dissipation at the extreme trailing edge tip through partial delamination of the composite airfoil without a more serious blade failure. This controlled release of energy reduces the chance of failing the composite plies in-plane by cracking and since cracks are more likely than delaminations to lead to the release of blade fragments, the acceptance of this controlled potential damage area is desirable because of all of the benefits of weight reduction and overall structural integrity of the blade and FOD resistance.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
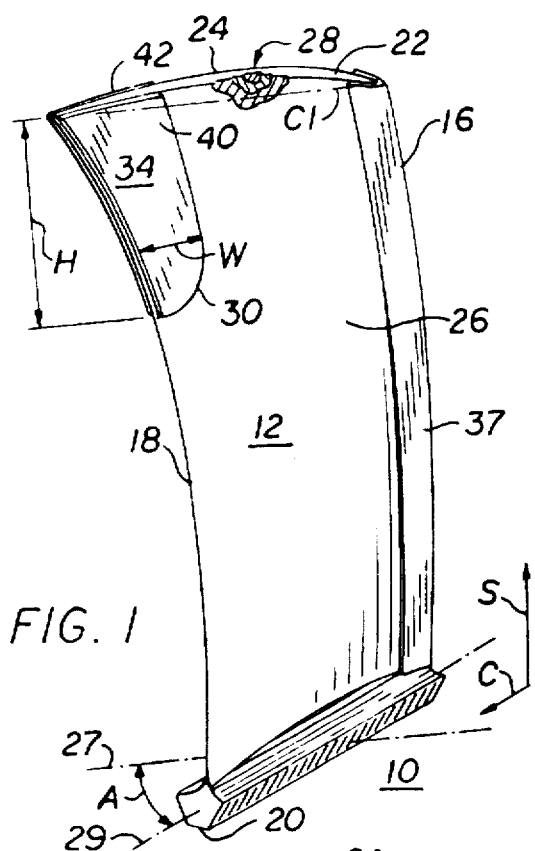
FIG. 1 is a perspective view of a turbofan engine composite fan blade in accordance with a first embodiment of the present invention.

Illustrated in FIG. 1 is a composite fan blade 10 for a high bypass ratio fanjet gas turbine engine (not shown) having a composite airfoil 12 typically extending in a chordwise direction C from a leading edge 16 to a trailing edge 18. The airfoil 12 extends radially outward in a spanwise direction S from a root 20 to a tip 22 generally defining its span and having a convex or suction side 24 and a concave or pressure side 26. The airfoil 12 is constructed from filament reinforced plies of a composite material, which results in laminations 28 formed substantially parallel to the suction and pressure sides 24 and 26, respectively of the airfoil 12. The airfoil 12 has a twist indicated by an increasing angle A, in the spanwise direction S from the root 20 to the tip 22, made by a projection 27 of a chord C1 with a centerline 29 of the root.

A reinforced surface region 30 is covered with a metallic sheathing 34 which extends over a portion of the airfoil 12 extending chordwise C from the trailing edge 18 towards the leading edge 16 and spanwise S from the tip 22 of the airfoil towards the root 20. The metallic sheathing 34 is disposed over a region 30 having a spanwise height H and chordwise width W which fully sufficiently covers only an area of the trailing edge 18 that is susceptible to damage during large trailing edge oscillations which result from impacts along the leading edge 16. As can be seen from the FIGS. this region has a maximum width that is smaller than half the maximum chord length C1 at the tip 22, and smaller than half the distance in spanwise direction S from the root 20 to the tip 22. One particular example provides a maximum width of 9" for a blade having a 21" maximum chord length. This is a very small amount or area and the sheathing 34 provides good protection from trailing delamination and failure caused by bending and stress due to impacts from birds strikes and engine ingestion of debris yet has a small if any penalty on the weight of the blade 10. The use of the trailing edge metallic sheathing 34 may have a weight benefit in that use of the sheathing may require less composite structure of the blade 10 and in amount that is greater in weight than that of the sheathing. An optional and preferred leading edge metallic shield 37 is disposed along the leading edge 16 in a conventional manner as is well known in the art.

Figure 2:
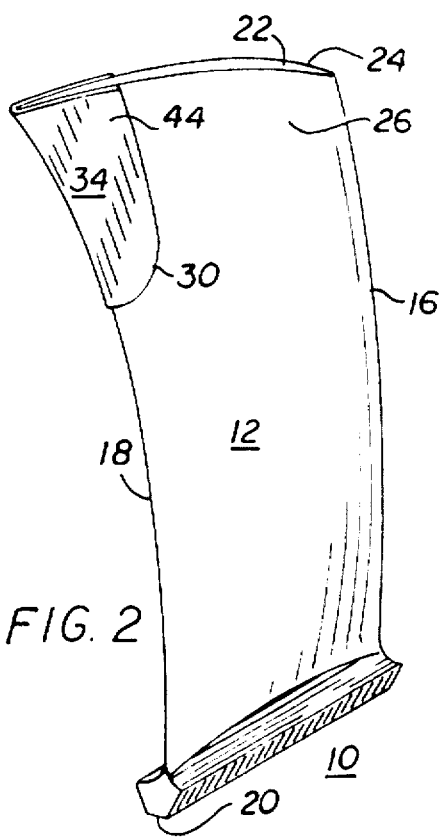
FIG. 2 is a perspective view of a turbofan engine composite fan blade in accordance with a second embodiment of the present invention.
Figure 3:
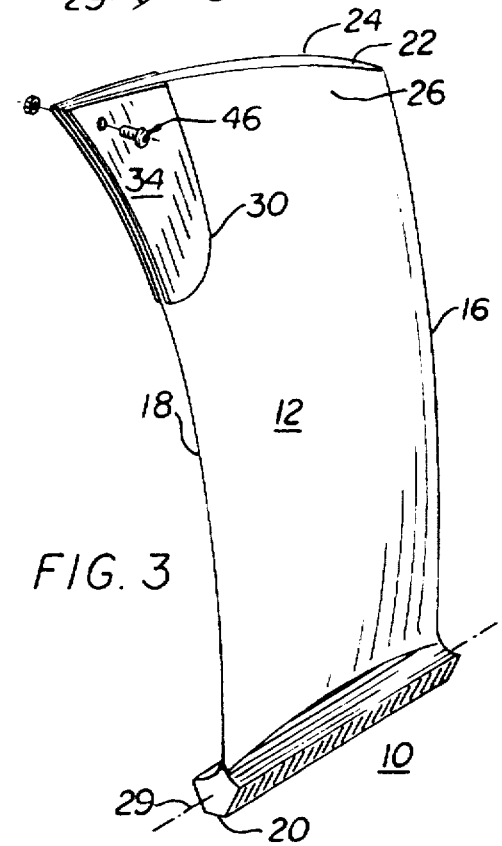
FIG. 3 is a perspective view of a turbofan engine composite fan blade in accordance with a third embodiment of the present invention.

The particular embodiment of the present invention illustrated in FIG. 1 provides metallic sheathing 34 in the form of two thin metallic sheets, a first sheet 40 that is bonded to the pressure side 26 of the airfoil 12 and a second sheet 42 that is bonded to the suction side 24 of the airfoil 12. An alternative or derivative embodiment is to use only one single thin metallic sheet, either the first sheet 40 bonded to the pressure side 26 or the second sheet 42 bonded to the suction side 24 of the airfoil 12. Another embodiment of the present invention, illustrated in FIG. 2, provides the metallic sheathing 34 in the form of a single thin metallic double width sheet 44 wrapped around the trailing edge 18 and bonded to both the pressure side 26 and the suction side 24 of the airfoil 12. FIG. 3 illustrates an optional feature of the present invention including the two previously discussed embodiments. Illustrated in FIG. 3 is a mechanical fastener 46 disposed through the entire local thickness of the airfoil 12 and, its metallic sheathing 34 which is bonded to the pressure and/or suction sides 26 and 24, respectively of the airfoil. The fastener 46 further secures the metallic sheathing 34 to the airfoil 12.

Figure 4:
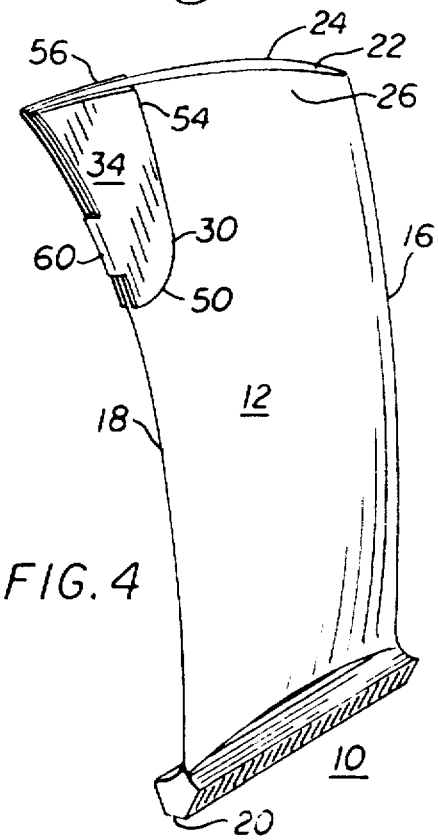
FIG. 4 is a perspective view of a turbofan engine composite fan blade in accordance with a fourth embodiment of the present invention.

Illustrated in FIG. 4 is a more specific embodiment of the present invention provides the metallic sheathing 34 in the form of a thin metallic one-piece sheet 50 having a first section 54 bonded to the pressure side 26 and a second section 56 bonded to the suction sides 24 of the airfoil 12. The first section 54 is connected by a bridge 60 to the second section 56 wherein the height of the bridge in the spanwise direction S is substantially shorter than the height of the sections and the bridge is wrapped around the trailing edge 18. This embodiment of the present invention provides for the construction of a light weight composite fan blade 10 that allows for some energy dissipation at the extreme tip of the trailing edge 18, in the reinforced surface region 30, through partial delamination of the composite airfoil 12 without a more serious blade failure. This controlled release of energy reduces the chance of failing the composite laminations (28 in FIG. 1) in-plane by cracking. Since cracks are more likely than delaminations to lead to the release of blade fragments and potential loss of the blade 10, it is more desirable to control potential damage with the present invention and still have the benefits of a lighter composite blade with overall improved structural integrity and FOD resistance.

While the preferred embodiment of the present invention has been described fully in order to explain its principles, it is understood that various modifications or alterations may be made to the preferred embodiment without departing from the scope of the invention as set forth in the appended claims.

We claim:

1. A composite blade comprising:

an airfoil having a pressure side and a suction side made from a composite material and extending chordwise from a leading edge to a trailing edge and spanwise from a root to a tip, and a reinforced surface region covered with a metallic sheathing wherein said region extends over only a portion of said airfoil spanwise from said tip towards said root, and said metallic sheathing further comprising a one-piece thin metallic sheet with a first section and a second section each having a section height in the spanwise direction connected by a bridge having a bridge height in the spanwise direction substantially shorter than the section height of either section wherein said bridge is wrapped around said trailing edge, and the first section is bonded to the airfoil pressure side and the second section is bonded to the airfoil suction side.

2. A composite blade according to claim 1 wherein said reinforced surface region extends over only a portion of said airfoil spanwise less than 50% from said tip towards said root.

3. A composite blade as claimed in claim 1 further comprising a leading edge metallic shield.

4. A composite blade as claimed in claim 1 further comprising a mechanical fastener disposed through said sheathing and said pressure and suction sides of said airfoil to further secure said sheathing to said airfoil.

* * * * *